United States Patent
Calmon et al.

(10) Patent No.: US 11,537,847 B2
(45) Date of Patent: Dec. 27, 2022

(54) TIME SERIES FORECASTING TO DETERMINE RELATIVE CAUSAL IMPACT

(71) Applicant: INTERNATIONAL BUSINESS MACHINES CORPORATION, Armonk, NY (US)

(72) Inventors: Flavio D. Calmon, White Plains, NY (US); Fenno F. Heath, III, Woodbridge, CT (US); Richard B. Hull, Chatham, NJ (US); Elham Khabiri, Briarcliff Manor, NY (US); Matthew D. Riemer, Yorktown Heights, NY (US); Aditya Vempaty, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 910 days.

(21) Appl. No.: 15/236,215

(22) Filed: Aug. 12, 2016

(65) Prior Publication Data
US 2017/0364803 A1    Dec. 21, 2017

Related U.S. Application Data

(60) Provisional application No. 62/351,521, filed on Jun. 17, 2016.

(51) Int. Cl.
*G06N 3/04* (2006.01)
*G06Q 30/02* (2012.01)

(52) U.S. Cl.
CPC ....... *G06N 3/0454* (2013.01); *G06Q 30/0201* (2013.01)

(58) Field of Classification Search
CPC ............. G06N 3/0454; G06Q 30/0201; G05B 2219/32335
See application file for complete search history.

(56) References Cited

U.S. PATENT DOCUMENTS 6,577,962 B1 *   6/2003   Afshari ................. G06Q 10/06
                                                700/291
6,928,398 B1 *   8/2005   Fang ..................... G06Q 10/06
                                                703/2

(Continued)

FOREIGN PATENT DOCUMENTS

CN          102495944 B       6/2012

OTHER PUBLICATIONS

Lon-Mu Liu et al, "Computational Statistics & Data Analysis—Data mining on time series: an illustration using fast-food restaurant franchise data", 2001, Elsevier, vol. 37 Issue 4, p. 470. (Year: 2001).*

(Continued)

*Primary Examiner* — Alexey Shmatov
*Assistant Examiner* — Clint Mullinax
(74) *Attorney, Agent, or Firm* — Intelletek Law Group, PLLC; Gabriel Daniel, Esq.

(57) ABSTRACT

A method and system are provided to calculate a future behavioral data and identify a relative causal impact of external factors affecting the data. Behavioral data and data for one or more external factors are harvested for a first time period. New behavioral data is harvested for a second time period. New data for the second time period is harvested. Based on a second training algorithm, a forecast time series value of a future behavioral data for a third time period that is after the second time period is calculated. A relative causal impact between each external factor and the predicted time series value of the behavioral data, for the third time period, is identified.

24 Claims, 7 Drawing Sheets

(56) References Cited

U.S. PATENT DOCUMENTS

| | | | | |
|---|---|---|---|---|
| 2005/0246220 | A1* | 11/2005 | Thomson | G06Q 10/04 705/7.35 |
| 2007/0299798 | A1 | 12/2007 | Suyama et al. | |
| 2010/0030617 | A1* | 2/2010 | Handley | G06Q 10/06 358/1.15 |
| 2010/0082442 | A1* | 4/2010 | Ma | G06Q 10/04 705/14.73 |
| 2010/0179930 | A1 | 7/2010 | Teller et al. | |
| 2011/0066579 | A1 | 3/2011 | Ikada | |
| 2012/0284213 | A1 | 11/2012 | Lin et al. | |
| 2012/0323537 | A1* | 12/2012 | Bocharov | G06F 17/18 703/2 |
| 2013/0015708 | A1* | 1/2013 | Ukita | H02J 3/32 307/43 |
| 2015/0112900 | A1* | 4/2015 | Ariyoshi | G06N 20/00 706/12 |
| 2015/0186792 | A1* | 7/2015 | Chidlovskii | G06Q 50/26 706/12 |
| 2016/0132775 | A1* | 5/2016 | Baughman | G06N 20/00 706/12 |

OTHER PUBLICATIONS

Kuo, "A sales forecasting system based on fuzzy neural network with initial weights generated by genetic algorithm", 2001, European Journal of Operational Research, vol. 129, Issue 3, pp. 496-517. (Year: 2001).*

Jain et al, "Sales Forecasting for Retail Chains", 2015, Tech. Rep. in Dept. of Computer Science, University of California San Diego , pp. 1-6. (Year: 2015).*

Kuo et al, "A sales forecasting system based on fuzzy neural network with initial weights generated by genetic algorithm", 2001, European Journal of Operational Research, vol. 129, Issue 3, pp. 496-517. (Year: 2001).*

Bahdanau et al. "Neural Machine Translation by Jointly Learning to Align and Translate," ICLR 2015, 2014.

Jacobs et al. "Adaptive Mixtures of Local Experts," Neural Computation 3.1 (1991): 79-87.

Jordan et al. "Hierarchical Mixtures of Experts and the EM Algorithm," Neural computation 6.2 (1994): 181-214.

Riemer et al. "Correcting Forecasts with Multi-force Neural Attention," Feb. 18, 2016, submitted for publication.

Sfetsos et al. "Time Series Forecasting of Averaged Data With Efficient Use of Information," IEEE Transactions on Systems Man and Cybernetics, vol. 35, No. 5, pp. 738-745, 2005, ISSN: 1083-4427.

Singh et al. "An Effective Neural Network and Fuzzy Time Series-Based Hybridized Model to Handle Forecasting Problems of Two Factors," Knowledge and Information Systems, vol. 38, No. 3, pp. 669-690, 2014, ISSN: 0219-1377.

* cited by examiner

TIME SERIES FORECASTING TO DETERMINE RELATIVE CAUSAL IMPACT

BACKGROUND

Technical Field

The present disclosure generally relates to predictive analytics, and more particularly, to time-series data prediction based on attention-based neural networks and interpretable neural networks.

Description of the Related Art

Predictive analytics generally refers to techniques for extracting information from data to create a model that can predict an output from a given input. For example, predicting an output can include predicting future trends or behavior patterns, or performing sentiment analysis. Various types of predictive models can be used to analyze data and generate predictive outputs. Typically, a predictive model is trained with training data that includes input data and output data that mirror the form of input data that is entered into the predictive model and the desired predictive output, respectively. The different types of predictive models available are extensive. Different models behave differently depending on the type of input data. Multiple predicative models may be trained using the same set of training data, yet each trained model may generate outputs with varying degrees of accuracy. To that end, neural networks can provide quantitatively accurate data forecasts. However, neural networks are not widely adopted in industry because the improvements offered in the predictive models are not readily interpretable. It is with respect to these considerations and others that the present disclosure has been written.

SUMMARY

According to various exemplary embodiments, a computing device, a non-transitory computer readable storage medium, and a method are provided to calculate future behavioral data and identify a relative causal impact of external factors affecting the data. Behavioral data as a first set of one or more time series for a first time period is harvested by a computing device. One or more external factors as a second set of one or more time series of the first time period are harvested. New behavioral data as a continuation of the first set of the one or more time series, for a second time period, is harvested. New data for the one or more external factors as a continuation of the second set of the one or more time series, for the second time period, is harvested. Based on a second training algorithm, a forecast time series value of a future behavioral data as the continuation of the first set of the one or more time series, for a third time period that is after the second time period, is calculated. A relative causal impact between each external factor and the predicted time series value of the behavioral data is identified for the third time period.

In one exemplary embodiment, harvesting the behavioral data comprises receiving the first set the of one or more time series. The first set of the one or more time series is stored in a storage device. A first training algorithm is applied to the first set of the one or more time series to create a first statistical prediction model that does not include the external factors. Further, in one exemplary embodiment, harvesting the one or more external factors comprises receiving the second set of the one or more time series, storing the second set of the one or more time series in the storage device, and applying a second training algorithm to the second set of the one or more time series and the first statistical prediction model to create a second statistical prediction model.

In one exemplary embodiment, the identification of the relative causal impact is in a form of a score. More emphasis is assigned to an external factor, the higher its relative causal impact score.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure relates to time-series data prediction based on attention-based neural networks. A neural network-based forecasting system is described that may be (i) scalable, (ii) adaptable to multiple data sources, and (iii) interpretable. The baseline forecast is adjusted by a series of observations related to several external feature groups, sometimes referred to herein as factors. The neural network attention model discussed herein provides, for each observation, an interpretable additive effect on the baseline of the time series forecast. For example, the system assumes that each observation of each factor considered by a prediction engine can be expressed as having an additive relationship with the expected forecast. Such approach makes possible for the relationships between factors and predicted data to be hierarchically interpretable. The notions of additive relationship and the hierarchical interpretation are discussed in greater detail later.

The model is both sufficiently powerful to achieve accurate empirical results and provides reasoning regarding the relative causal impact of external factors on the prediction, which is interpretable to end user analysts. Thus, analysts of the predicted results are able to better interpret the reason for the predicted results with confidence, which is typically not available in known approaches. For example, the system described herein assumes that each observation of each external factor considered by a prediction engine can be expressed as having an additive relationship with the expected forecast. Additionally, the relative causal impact, which may be represented as a score, is provided regarding the effect of each external factor for each forecasted value. External factors are discussed in more detail below.

Reference now is made in detail to the examples illustrated in the accompanying drawings and discussed below.

Example Architecture

Figure 1:
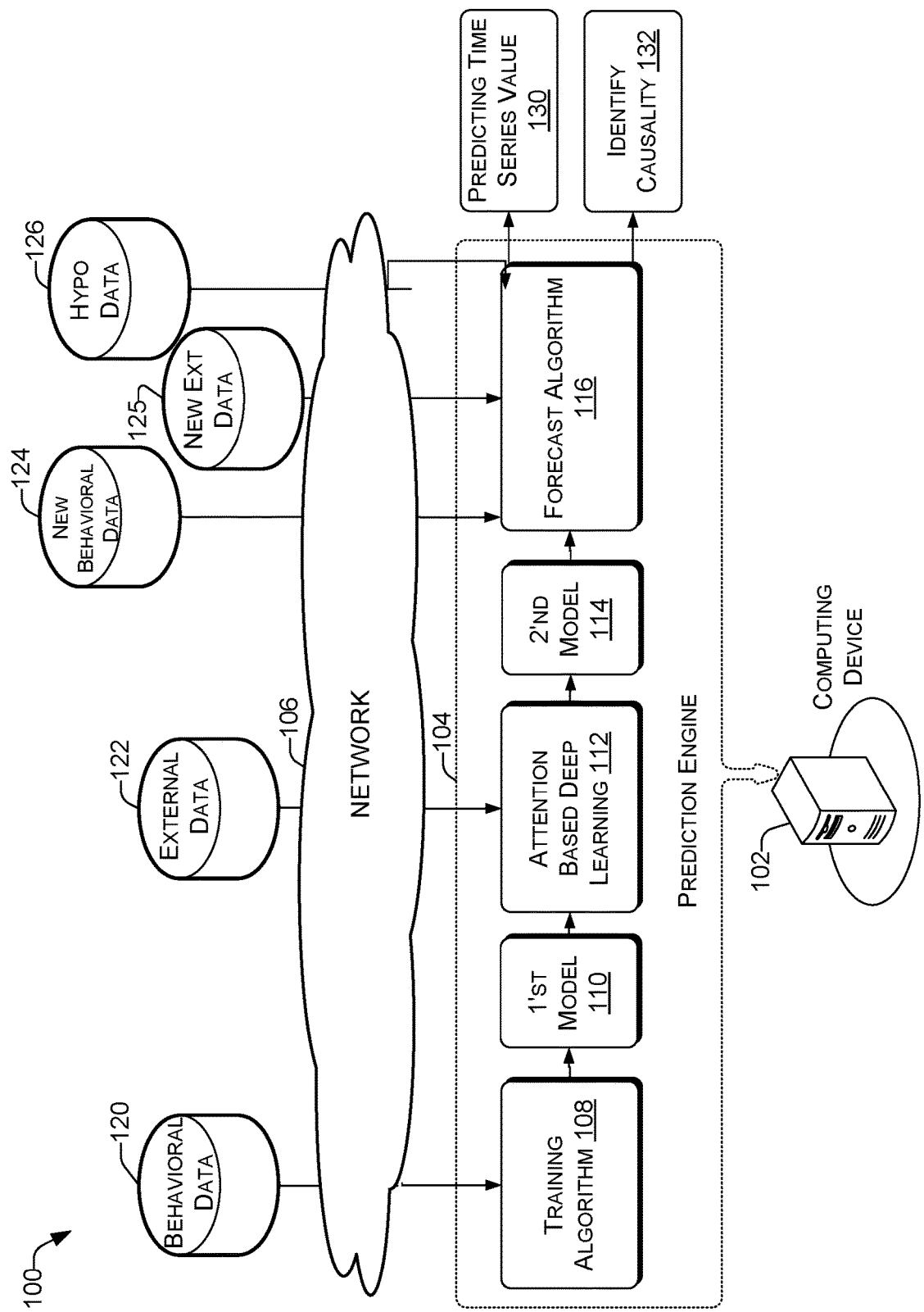
FIG. 1 illustrates an example system that provides a predictive analytic platform.

FIG. 1 illustrates an example system that provides a predictive analytic platform. System 100 includes a network 106 that allows a computing device 102 to communicate with various data sources, such a behavioral data source 120, an external data source 122, a new behavioral data source 124 that may be a continuation of the behavioral data source 120, and a hypothetical data source 126. The network 106 may be, without limitation, a local area network ("LAN"), a virtual private network ("VPN"), a mobile and/or cellular network, the Internet, or a combination thereof. For example, the network 106 may include a mobile and/or cellular network that is communicatively coupled to a private network, sometimes referred to as an intranet that provides various ancillary services, such as communication with various behavioral and external data sources, as well as the Internet. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users. The network 106 allows the prediction engine software 104 operating on the computing device 102 to predict a time series value 130 for a behavioral data and/or identify a relative causal impact 132 of external data on the predicted time series value 130.

For example, the prediction engine 104 may harvest behavioral data 120 via the network 106. This behavioral data 120 may be as one or more set of time series, which is used by a training algorithm 108 to create a first statistical prediction model 110. The behavioral data 120 is based on a type (e.g., category) of target data to be predicted by the prediction engine 104. For example, in a retail scenario, the behavior data 120 may relate to sales data for a product (e.g., total sales dollars and/or unit counts) for a product or product category over a predetermined time period (e.g., day, week, month, etc.). The first statistical prediction model 110 does not include any external data 122.

As used herein, external data 122 relates to groups of features, explanatory variables, and observations, collectively referred to herein as external factors, which may affect the time series data of the behavioral data 120, but are not created by the subject or subjects of the behavior. For example, external factors may include, without limitation, weather, regional and/or national events, social media signals, economic indicators, price of gasoline, etc. The prediction engine 104 of the computing device 102 harvests the external data 122 and combines it with the first prediction model to create a second prediction model 114. Put differently, the second prediction model is based on the one or more set of time series of the behavioral data 120 and one or more time series of the external data 122. This second prediction model 114 can then be used by a forecast algorithm 116 to make predictions based on new behavioral data 124 and new external data 125.

For example, the forecast algorithm 116 uses the second statistical prediction model 114 together with new behavioral data 124 and new external data 125 (i.e., received over the network 106) to predict a value of the target time series for a predetermined time period 130. In various embodiments, the new behavioral data 124 is related to the behavioral data 120 in that it may be a continuation and/or a later time segment of the one or more set of time series of the behavioral data 120. For example, continuing the retail example, if the original behavioral data 120 related to sales for a product for a first time period (e.g., months 1 to 24), the new behavioral data 124 may be for a subsequent time period (e.g., month 25). The new external data 125 is related to the external data 122 in a similar way. For example, the external data 122 may include weather as an external factor for months 1 to 24. Similarly, the new external data 125 may be for the weather of month 25.

In addition to predicting a time series value 130 for the target time series, the forecast algorithm 116 identifies a relative causal impact between the factors of the external data 122 (which are also in the new external data 124), and the behavioral data 120 (and new behavioral data 124). In various embodiments, the prediction engine may be run in isolation, or it can be run together with a time-series forecasting algorithm that does not include external forces. As described herein, an initial part of the time series to be predicted is used as a training set, which is used to create a first statistical prediction model 110 and a second statistical prediction model 114. These statistical prediction models are used to compute forecasts for subsequent time periods.

In some embodiments, the stronger the relative causal impact of the external factor, the higher score the external factor receives by the prediction engine. The relative causal impact may be provided to subscribers of the forecast service discussed herein. Alternatively or in addition, the higher the relative causal impact score, the more emphasis is attributed by the prediction engine to the corresponding external factors. In one embodiment, the prediction engine may operate iteratively. For each iteration the external forces that have a score above a predetermined threshold may be attributed more emphasis than other external factors for the prediction of the forecast value. In another embodiment, the prediction engine 104 assigns progressively more weight the higher the score of the external factor.

The prediction engine 102 may be operated in two different modes, namely (i) in a historical forecast mode, and (ii) in a "what-if" mode. In the historical forecast mode, the trained statistical model(s) are applied to time intervals that occur after the training set. The forecasted values can then be compared with the actual values (e.g., using statistical aggregation functions such as mean absolute percentage error (MAPE)). In the "what-if" mode, the trained models are used together with recent behavioral data and external data (i.e., of external factors) to make a prediction about the time series behavior for a future time period.

While the computing device 102 is illustrated by way of example to be part of a single device, it will be understood that in various embodiments, the computing device 102 may comprise virtual computing devices in the form of virtual machines or software containers that are hosted in a cloud, thereby providing an elastic architecture for processing and storage. The computing device may be maintained by a service provider company or an organization interested in providing forecasts and in identifying the relative causal impact of the factors that may affect various products and services.

Figure 2:
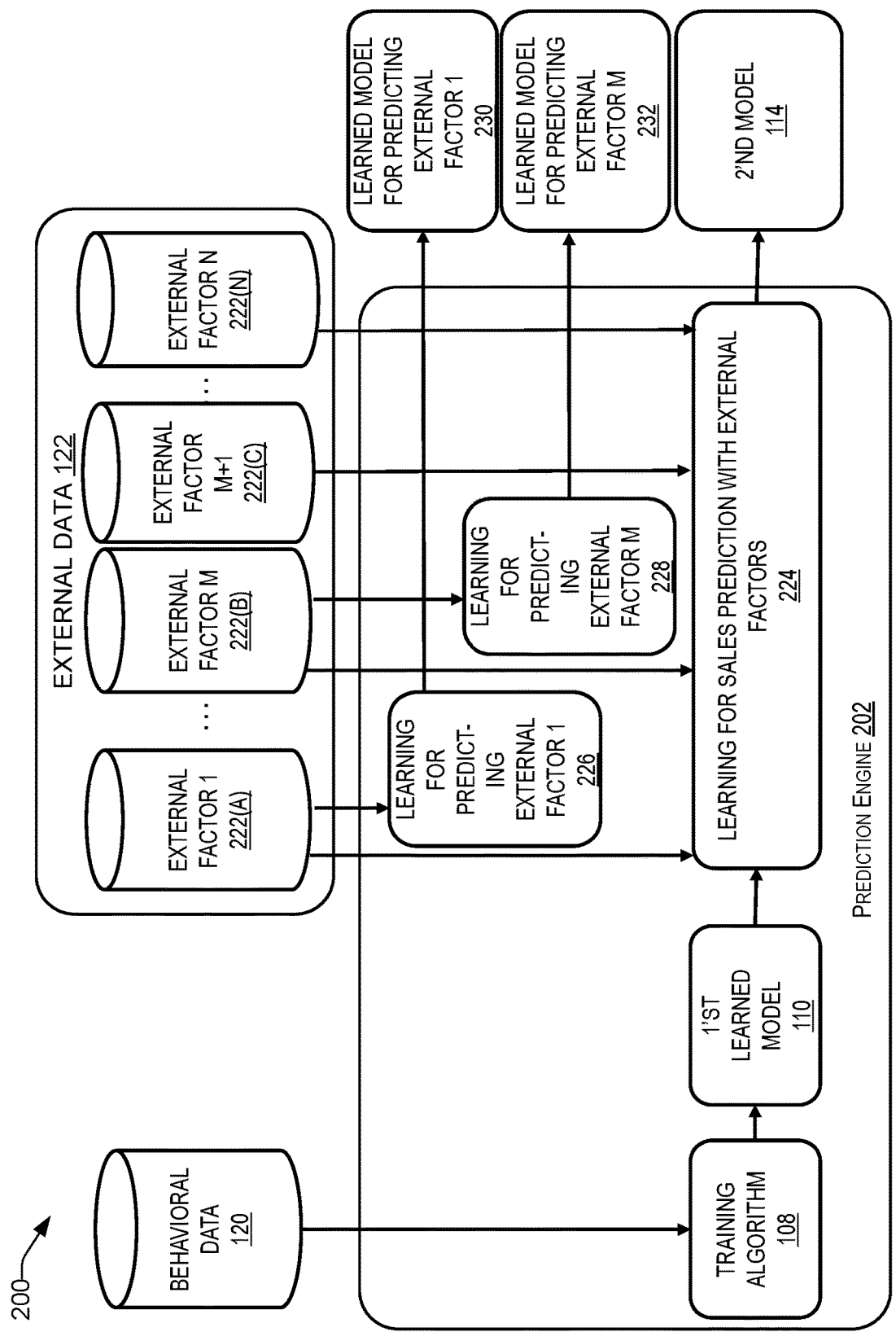
FIG. 2 is a block diagram that illustrates a learning phase, consistent with an exemplary embodiment.

Reference now is made to FIG. 2, which is a block diagram 200 that illustrates a learning phase, consistent with an exemplary embodiment. The prediction engine 104 receives behavioral data 120, which may be in the form of one or more set of time series. By way of illustrative example only and not limitation, it will be assumed that the behavioral data is related to a retail environment. For example, the behavioral data 120 may relate to the sales history of a product (e.g., coffee beans) for a predetermined period, sometimes referred to herein as a training period. The training period may be any suitable training period, such as the last 6 months or specific months (e.g., months 1 to 24 from a starting date). The behavioral data 120 is used by the training algorithm 108 to create a first statistical prediction model 110, which does not include external data.

The external data 122 may come from disparate sources and relate to different external factors 222(A) to 222(N). For example, the external factors 1 to N (i.e., 222(A) to 222(N)) may relate to weather, regional and/or national events, social media signals, economic indicators, price of gasoline, etc. Each of these external factors may have a different relative causal impact on the behavioral data 120.

The external factors 1 to N (i.e., 222(A) to 222(N)) are each received by the prediction engine 202 as a time series. In one embodiment, machine learning is applied to one or more external factors such that a learned model can be created for the external model, respectively. As used herein, machine learning is the application of statistical and/or cognitive machine methods, where an initial model is crated from an initial corpus of data, and adapted based on new incoming data. For example, the time series of the external factor 1 (i.e., 222(A)) is used as a source for learning 226 to be able to later predict a value of the external factor 1 at a different time period (e.g., where the external data may not be available). The results of the machine learning 226 are used to create a learned model 230 for predicting the external factor 1 (i.e., 222(A)). Similarly, the time series of the external factor M (i.e., 222(B)) can be used as a source for machine learning 228 to create a learned model for predicting the external factor M (i.e., 222(B)) 232.

In some embodiments, a learned model for predicting an external factor is not created for all models. Rather, the data may be provided directly by the external factor, as in factor N (i.e., 222(N)). For example, factor N may relate to a regional weather condition or a price of gas. Such external factor time series for a future time period may not be predicted by the prediction engine 202; rather, it may be provided by a third party vendor such as a weather forecast service or a futures commodity market that specializes in predicting future values for such external factors.

The prediction engine 202 combines the harvested external data 122 with the first statistical prediction model 110 by applying machine learning 224 to create a second statistical prediction model 114. In one embodiment, a "least absolute shrinkage and selection operator" (LASSO) regression analysis approach may be used together with Dynamic Linear Modeling (DLM), to include the external factors.

Accordingly, what is made available for future processing by the learning phase 200 is a first statistical prediction model 110 and a second statistical prediction model 114. In some embodiments, learned model(s) for predicting one or more external factors are provided as well, as illustrated by blocks 230 and 232.

In various embodiments, the learning phase 200 may be performed at predetermined intervals (e.g., every quarter, year, etc.,) or upon a trigger event, such as when a threshold condition is met (e.g., sales fall below a predetermined threshold, there is a spike in demand for a product, cost of gas is above a predetermined threshold, etc.,) or upon request from a subscriber of the service described herein.

Figure 3:
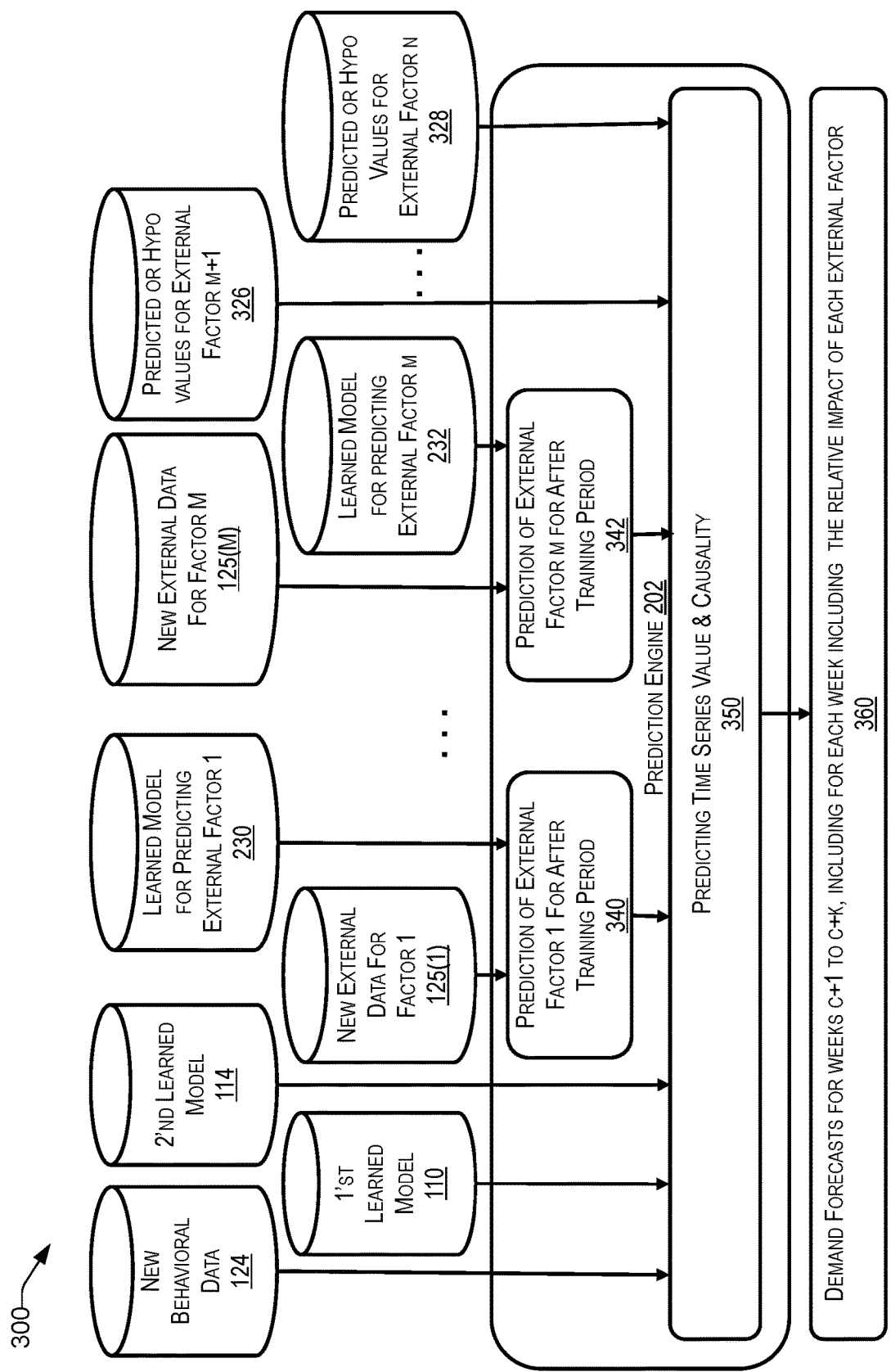
FIG. 3 is a block diagram that illustrates a learning prediction phase, consistent with an exemplary embodiment.

FIG. 3 is a block diagram 300 that illustrates a prediction phase, consistent with an exemplary embodiment. During the prediction phase, the prediction engine 202 is configured to receive new behavioral data and new external data to predict a time series value and its relative causal impact with respect to the external data. For example, the forecast algorithm of the prediction engine 202, represented in FIG. 3 by block 350, uses the new behavioral data 124, the first statistical learned prediction model 110 and the second learned statistical prediction model 114 together with new external data (e.g., 322 and 326) to predict a value of the target time series for a predetermined time period. For example, the first statistical prediction model 110 can be interpreted as an input to the second learned statistical prediction model 114. Accordingly, the first statistical prediction model 110 is used to produce the second learned statistical prediction model 114 during training and the first statistical prediction model 110 is also used as an input to the second learned statistical prediction model 114 to generate predictions.

The new behavioral data 124 is related to the behavioral data 120 in that, in various scenarios, it may be a continuation and/or a later time segment of the one or more set of time series of the behavioral data 120 discussed in the context of FIG. 2. For example, the new behavioral data 124 may include a time series for a period from an end of the training period for the learning phase 200 to and including week C.

The external data may relate to various factors, illustrated by way of example in FIG. 3 as factors 1 (i.e., 125(1)) to M (i.e., 125(M)), which may be a different time segment (e.g., a continuation) of the factors 1 to M of FIG. 2. For example, the new external data for factor 1 (i.e., 125(1)) may include values for a time series from an end of the training period up to and including week C.

In one embodiment, for each external factor of the new external data 125(1) to 125(M), a learned model for predicting the corresponding external factor is used (e.g., 230 and 232, respectively) to predict a time series value of the external factor for the target time period. For example, the new external data for factor 1 (i.e., 125(1) and the learned model for predicting the external factor 1 that were provided by the learning phase of FIG. 2, are used to predict the external factor 1 340 for weeks C+1 to C+K. The same action may be performed for other new external factors. For example, the new external data for factor M (i.e., 125(M) and the learned model for predicting the external factor M (i.e., 232), are used to predict the external factor M 342 for weeks C+1 to C+K.

In some embodiments, third party predicted or hypothetical values for other factors, illustrated herein by way of example only and not limitation as external factors M+1 (i.e., 326) to N (i.e., 328) may be provided to the prediction engine 202 without a prediction of the external factor for the target time segment by the prediction engine 202. Put differently, other external factors may be provided by third parties directly to the prediction engine 202.

The prediction engine 202 uses the new behavioral data 124, the first statistical prediction model 110, and the predicted external factors 340 and 342 to predicting a time series value 130 for the target time series (e.g., for a time period C+1 to C+K for the present example), represented by block 350. For example, a sales forecast may be provided for a product for weeks C+1 to C+K. In some embodiments, hypothetical values, representing "what if" scenarios, such as "what if there will be a hurricane?" or "what if the price of gas reaches $120/barrel?" are used to predict a time series value 130 for the target time series.

Additionally, the prediction engine 202 identifies a relative causal impact between each factor of the new external data and the new behavioral data 124. Thus, the prediction engine 202 provides as an output 360 not only a predicted (i.e., forecast) value for the target time series for a predetermined time period (e.g., C+1 to C+K), but also provides the relative causal impact of each external factor on the forecast value.

The information regarding the relative causal impact (e.g., strength) provides a user of the prediction engine better insight to the cause(s) for the forecasted value(s). Further, such information allows the prediction engine to focus on and/or request more data of external factors that are calculated to have a stronger relative causal impact on the forecasted value(s). Thus, specific external factors (e.g., that have a score that is above a predetermined threshold and/or are in the top number N in score) may be focused on to compute the predicted time series value. Such approach has a large impact on neural computation in that the accuracy of the predicted time series as well as computational time efficiency are improved.

The forecast algorithm may be executed across one or multiple dimensions of the family of time series to be predicted. For example, in a retail situation, one dimension may be across the set of product categories at a given level in a product taxonomy, and another dimension may be across the individual stores of the retailer. In a retail setting, the forecast algorithm discussed herein is elastic in that it may be run for a single product category and for a store at a time, or may be run for each product category in aggregate with each run including all stores in one or more regions, or any combination thereof.

Example Process

Figure 4:
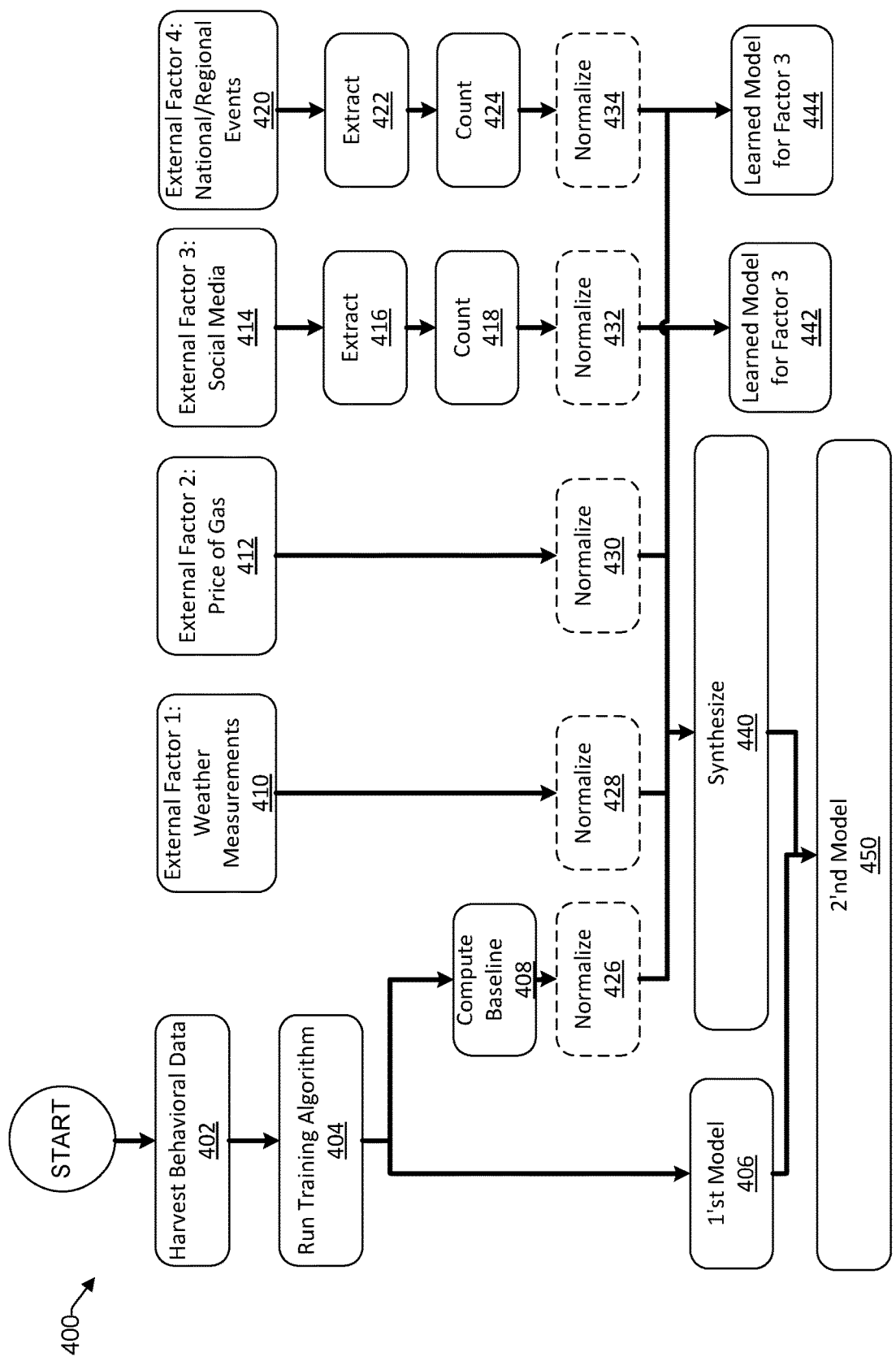
FIG. 4 illustrates a process of a learning phase of the prediction engine, consistent with an exemplary embodiment.
Figure 5:
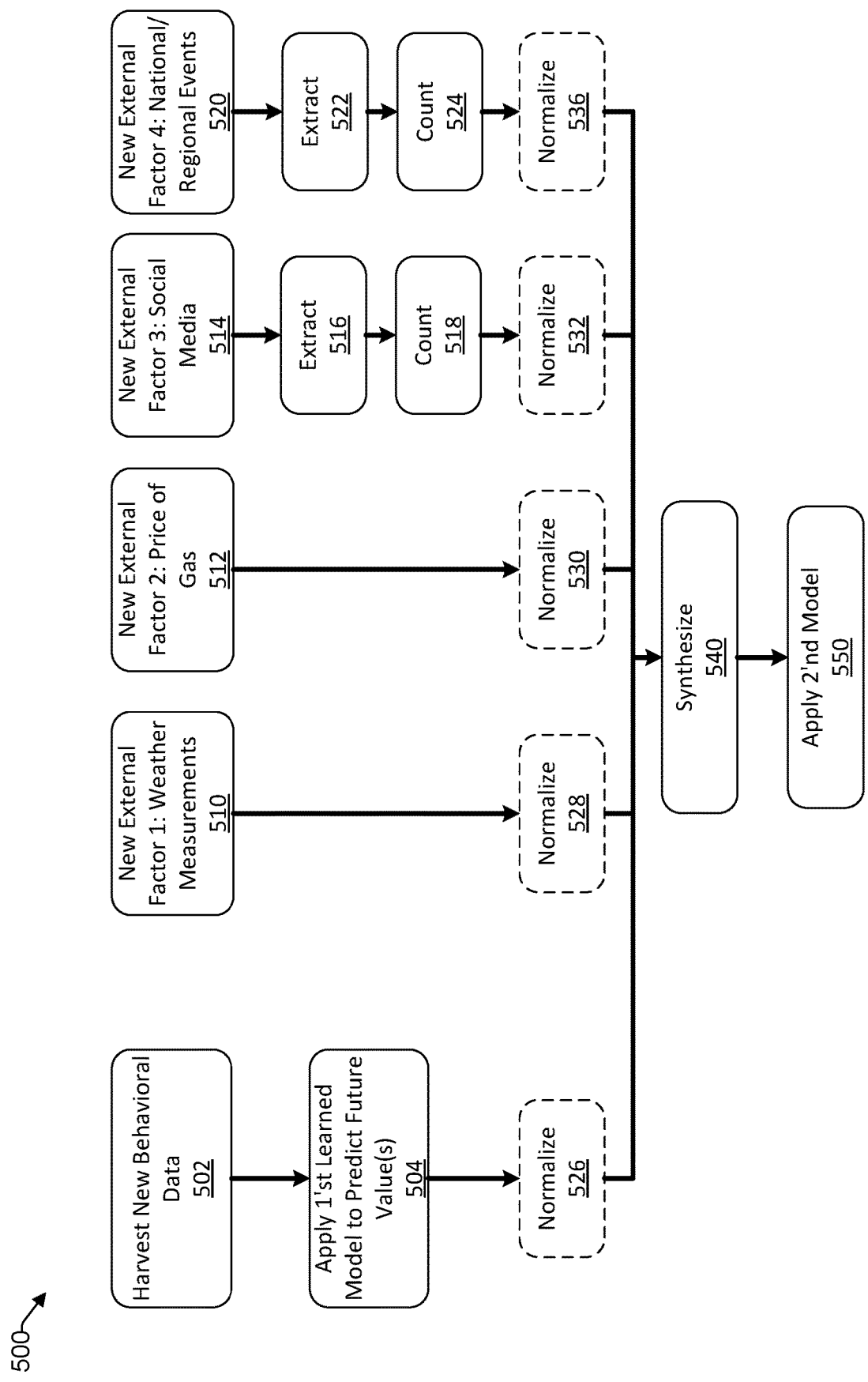
FIG. 5 illustrates a process for predicting a time series value and a causality thereof, consistent with an exemplary embodiment.

With the foregoing overview of the system 100 and different phases of operation 200 and 300, it may be helpful now to consider a high-level discussion of example processes. To that end, FIGS. 4 and 5 present illustrative processes 400 and 500 for predicting a time series value and relative causal impact thereof. Process 400 describes a learning phase of the prediction engine, process 500 describes a prediction phase that may be performed after the learning phase, and process 600 describes a high level process of the learning phase and the prediction phase.

Processes 400, 500, and 600 are illustrated as a collection of blocks in logical flowcharts, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the processes 400, 500, and 600 are described with reference to system 100 of FIG. 1. Further, processes 400, 500, and 600 are described by way of example only and not by way of limitation, in a retail scenario in connection with a single product category for multiple stores in a predetermined (i.e., target) region.

At block 402, the prediction engine 104 of the computing device 102 harvests behavioral data. For example, the behavioral data may relate to the sales history for a product category (e.g., coffee beans) for across all stores in a target region (e.g., NY). To that end, the sales data may be aggregated for predetermined periods, such as by week, for each store, and stored in a memory of the computing device 102. Various forms of time series analysis may be performed, such as the autoregressive integrated moving average (ARIMA) model.

At block 404, a training algorithm is run on the harvested behavioral data. Consequently, at block 406 a first statistical prediction model is created based on the time series of the harvested behavioral data.

Returning to block 404, in one embodiment, a baseline is computed for the time series of the harvested behavioral data (i.e., block 408). As used herein, "baseline" refers to predicted value(s) of the time series of the harvested behavioral data that do not include external factors. For example, sales data may be predicted for a future date based on the existing time series of the harvested behavioral data of previous sales. Additional factors, such as weather, price of gas, etc., are not included in the baseline computation.

As discussed previously, the system also harvests external data, represented in the process 400 as external factors 1 to 4, which are stored in the memory of the computing device. Thus, the external data may come from disparate sources and relate to different external factors 1 to 4. For example, at block 410, the first external factor is determined. The first external factor may be weather, which may be measured for all weather stations in a target region for a predetermined time (i.e., training period). Similarly, additional external factors can be determined by the prediction engine 104.

Accordingly, at block 412, the second factor is determined. The second factor relate to the price of gas, which may be based on measurements the stores that carry the target product in a region, for the training period.

Similarly, at block 414, the third factor is determined. The third factor may be indicia from social media, such as Twitter, Snapchat, WhatsApp, Tumblr, Instagram, and the like. To that end, at block 416 an extractor is used to identify indicia (e.g., Tweets) that mention products in the product category. In one embodiment, at block 418, a count is obtained as to how many Tweets match the extractor for a predetermined time period (e.g., per week, during the training period). In various embodiments, the Tweets evaluated may be on a national scale or from the target region. To that end, machine learning may be used to identify patterns and trends in the time series.

Consequently, at block 442, results of the machine learning in connection with the external factor 3 are used to create a learned model 442 for predicting the external factor 3. The optional normalization step 432 is discussed later.

Similarly, at block 420, the fourth factor is determined. The fourth factor may relate to national and/or regional events. In this regard, a list of national and/or regional events may be obtained from a provider of such services, such as eventful.com. In one embodiment, there is a threshold requirement for what is considered to be an event. For example, if an event attracts fewer than a predetermined number of viewers/participants, then it is not considered as an event that is deemed a factor for evaluation. To the extent that it is considered an event, at block 422, an extractor is used to identify indicia (e.g., Tweets) that mention events included in this list. In one embodiment, at block 424, a count is obtained as to how many Tweets match the event extractor for predetermined time periods.

Consequently, at block 444, results of the machine learning in connection with the external factor 4 are used to create a learned model for predicting the external factor 4. The optional normalization step 444 is discussed later.

While the harvesting of the external data has been illustrated by way of example in different blocks, it will be understood that these blocks can be executed concurrently, in series, or in any suitable combination based on the targeted behavioral data. Further, while four factors have been illustrated in the example of FIG. 4, it will be understood that fewer or additional factors may be involved in the process 400.

In one embodiment, at blocks 426 to 434, the baseline computed for the time series of the harvested behavioral data from block 408, as well as the harvested external factors 1 to 4 (which may have been post-processed in blocks 416, 416, 418, 422, and 428), are normalized, respectively. For example, the time series values, which may be measured at different scales, are scaled to a common scale (e.g., 0 to 1). In some embodiments, data points that have been identified to be outliers (e.g., beyond ±3σ) are removed during normalization.

At block 440, the baseline computed for the time series of the harvested behavioral data from block 408, as well as the harvested external factors 1 to 4 (which may have been post-processed in blocks 416, 418, 422, and 428 and normalized in blocks 426 to 434, respectively), are synthesized. For example, the baseline and factors are joined together in that they are each sent to the second model as an input.

At block 450, the prediction engine 104 combines the harvested and synthesized external data in connection with external factors 1 to 4, with the first statistical prediction model 110 by applying machine learning based on neural-networks to create a second statistical prediction model.

In various embodiments, the learning phase process 400 may be performed at predetermined intervals (e.g., every quarter, year, etc.,) or upon a trigger event, such as when a threshold condition is met, or upon request from a subscriber of the service described herein.

Reference now is made to FIG. 5, which illustrates a process 500 that describes a prediction phase, consistent with an exemplary embodiment. At block 502, the prediction engine 104 harvests new behavioral data, which may be as a time series. The new behavioral data may be saved in a memory of the computing device 102. The new behavioral data may be a continuation of the first set of the one or more time series of the behavioral data related to block 402 of process 400. For example, sales data for the product category, across all stores in a target region, from the end of the training period up to the current week C may be obtained, sometimes referred to herein as the "new time period." In various embodiments, the sales data as one or more time series may be aggregated for a predetermined time period (e.g., day, week, month, etc.,) for each store that carries the target product. The prediction engine 104 also harvests new external data, represented in the process 500 as new external factors 1 to 4, which may be a continuation of the external factors 1 to 4 of process 400. The data related to these external factors may be saved in a memory of the computing device 102.

For example, at block 510, the new data for the first external factor is determined. As discussed in the context of process 400, the first factor may be weather, which may be measured for all weather stations in one or more target regions for the new time period that is after the training period (e.g., from the end of the training period to the current week C). In one embodiment, the prediction engine 104 obtains predicted and/or hypothetical weather measurements for all weather stations in the target region(s) for a future time period (e.g., weeks C+1 to C+K). Similarly, additional new data for other external factors can be harvested by the prediction engine 104.

Accordingly, at block 512, new external data for the second factor (i.e., price of gas) is obtained. For example, the price of gas measurements for the one or more target regions that have stores that carry the target product category for the new time period (e.g., from the end of the training period to the current week C). In one embodiment, the prediction engine 104 obtains the predicted and/or hypothetical price of gas for the target region(s).

Similarly, at block 514, new external data for the third factor (i.e., social media) is obtained for the new time period (e.g., from the end of the training period to the current week C). To that end, at block 516 an extractor is used to identify indicia (e.g., Tweets) that mention products in the product category during the new time period. In one embodiment, at block 518, the learned model for predicting this external factor is used to estimate Tweet count values regarding the product category for the future time period (e.g., weeks C+1 to C+K).

Similarly, at block 520, new external data for the fourth factor (i.e., national and/or regional events) is obtained. In this regard, at block 522, an extractor is used to identify indicia (e.g., Tweets) that mention events included in the list of events during the new time period (e.g., from the end of the training period to the current week C). In one embodiment, at block 524, the learned model for predicting this external factor is used to estimate Tweet count values regarding these national and/or regional events in the list of events for the future time period (e.g., weeks C+1 to C+K).

While the harvesting of the new external data has been illustrated by way of example in different blocks, it will be understood that these blocks can be executed concurrently, in series, or in any suitable combination based on the targeted behavioral data. Further, while four factors have been illustrated in the example of FIG. 5, it will be understood that fewer or additional factors may be involved in the process 500 and may depend on the number of factors considered during the learning phase of process 400.

In one embodiment, at blocks 526 to 536, the baseline computed for the time series of the harvested behavioral data from block 508 and the harvested external factors 1 to 4 (which may have been post-processed in blocks 416, 418, 422, and 428), are normalized, respectively.

At block 540, the predicted time series for the predetermined future time period (e.g., weeks C+1 to C+K) from block 504 (e.g., via block 526), as well as the harvested new data for the external factors 1 to 4 (which may have been post-processed in blocks 516, 518, 522, and 524) are synthesized.

At block 550, the forecast algorithm of the prediction engine 104 applies the second statistical prediction model on the new behavior and the predicted external factors to predict a time series value for the target time series (e.g., for a time period C+1 to C+K for the present example). Additionally, the prediction engine 104 identifies a relative causal impact between each factor of the new external data and the predicted time series value. Accordingly, not only does the prediction engine 104 provide a forecast regarding the demand and/or sales of a product category for one or more target regions, the prediction engine 104 also identifies the relative strength of the factors on the prediction. For example, the prediction engine 104 may identify that an upcoming event (e.g., super-bowl) has the strongest effect, while the predicted price of gas has the second strongest effect.

Figure 6:
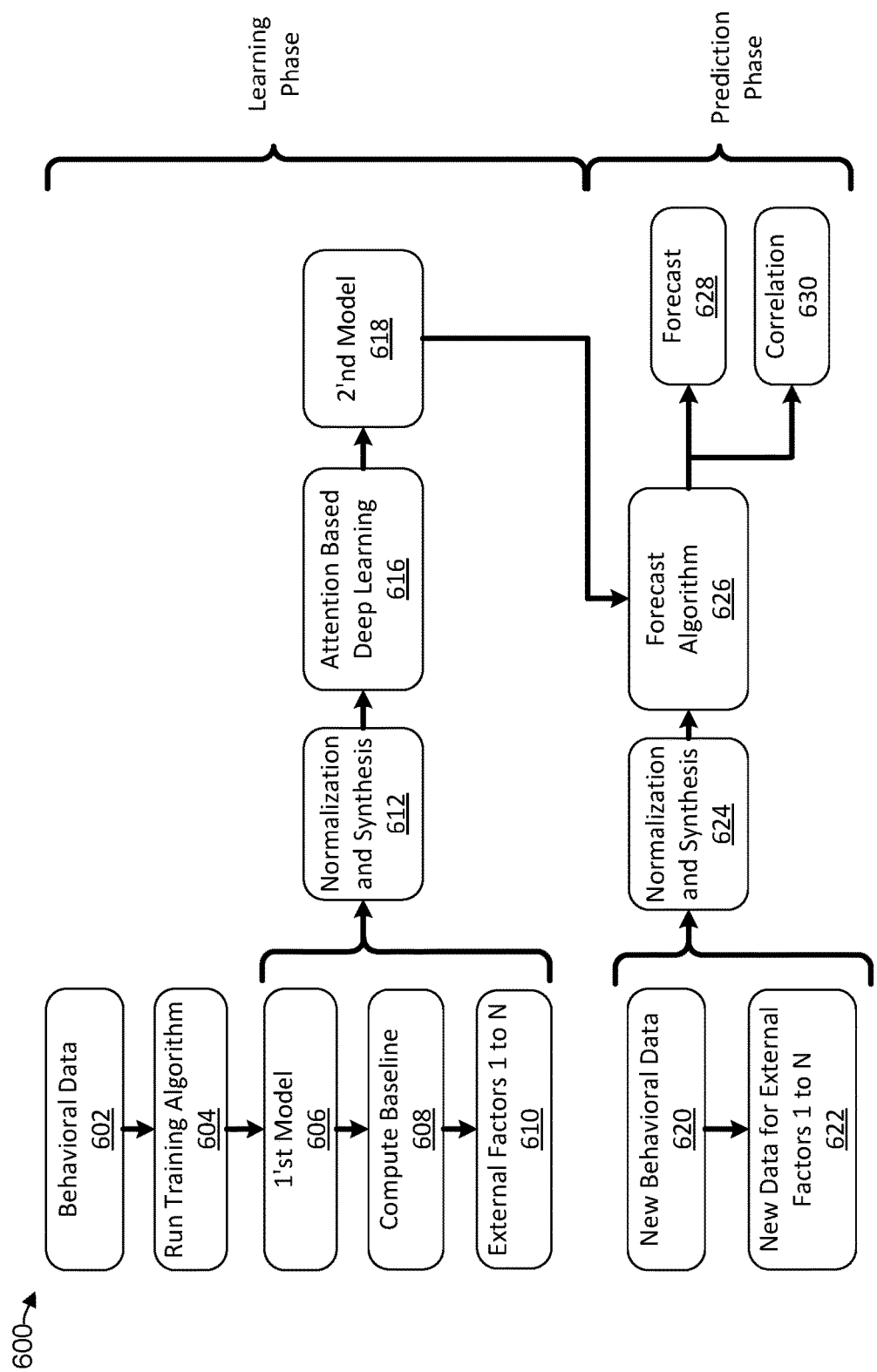
FIG. 6 illustrates a process that describes a learning phase followed by a prediction phase, consistent with an exemplary embodiment.

Reference now is made to FIG. 6, which illustrates a process 600 that describes a learning phase followed by a prediction phase, consistent with an exemplary embodiment. At block 602, the prediction engine 104 of the computing device 102 harvests behavioral data. For example, the behavioral data may relate to the sales history for a product category for a target region.

At block 604, a training algorithm is run on the harvested behavioral data.

At block 606, a first statistical prediction model is created, which does not include external data.

At block 608, a first statistical prediction model is created based on the time series of the harvested behavioral data. The first statistical prediction model is used to compute a baseline for a future date (e.g., up to K weeks forward).

At block 610, external factors 1 to N for a training period (e.g., weeks P to Q) are harvested, where N represents the number of external factors under consideration, P represents that start of the training period, and Q represents the end of the training period.

At block 612, the first statistical prediction model, the baseline computed for the time series of the harvested behavioral data, and the harvested data for external factors 1 to N are synthesized. In one embodiment, these inputs are normalized prior to synthesis.

At block 616, the prediction engine 104 applies attention based deep learning based on the output of block 612.

At block 618, the results of the attention based deep learning of block 616 are used to create a second statistical prediction model that includes external factors 1 to N.

The learning phase process may be performed at predetermined intervals or upon a trigger event, such as when a threshold condition is met, or upon request from a subscriber of the service described herein. Upon completion of the learning phase, the second statistical prediction model can be used for forecasting and providing an understanding of the relative causal impact between the predicted value(s) of the time series and the external factors (i.e., how the external factors 1 to N affect the prediction).

To that end, at block 620, the prediction engine 104 harvests new behavioral data for a new time period (e.g., C+1 to C+K, where C is the start of the new time period that is >Q, and K is the end of the new time period).

At block 622, new external data for each factor 1 to N is obtained.

At block 624, the new behavioral data is synthesized with the new external data. In one embodiment, these inputs are normalized prior to synthesis.

At block 626, the synthesized new behavioral and external data together with the second statistical prediction model is used in a forecast algorithm of the prediction engine 104.

At block 628, the prediction engine 104 of the computing device 102 provides a forecast time series value for the target time series (e.g., for a time period C+1 to C+K).

In addition, at block 630, the prediction engine 104 identifies a relative causal impact between each factor of the next external data and the predicted time series of the behavioral data.

Example Computing Device

Figure 7:
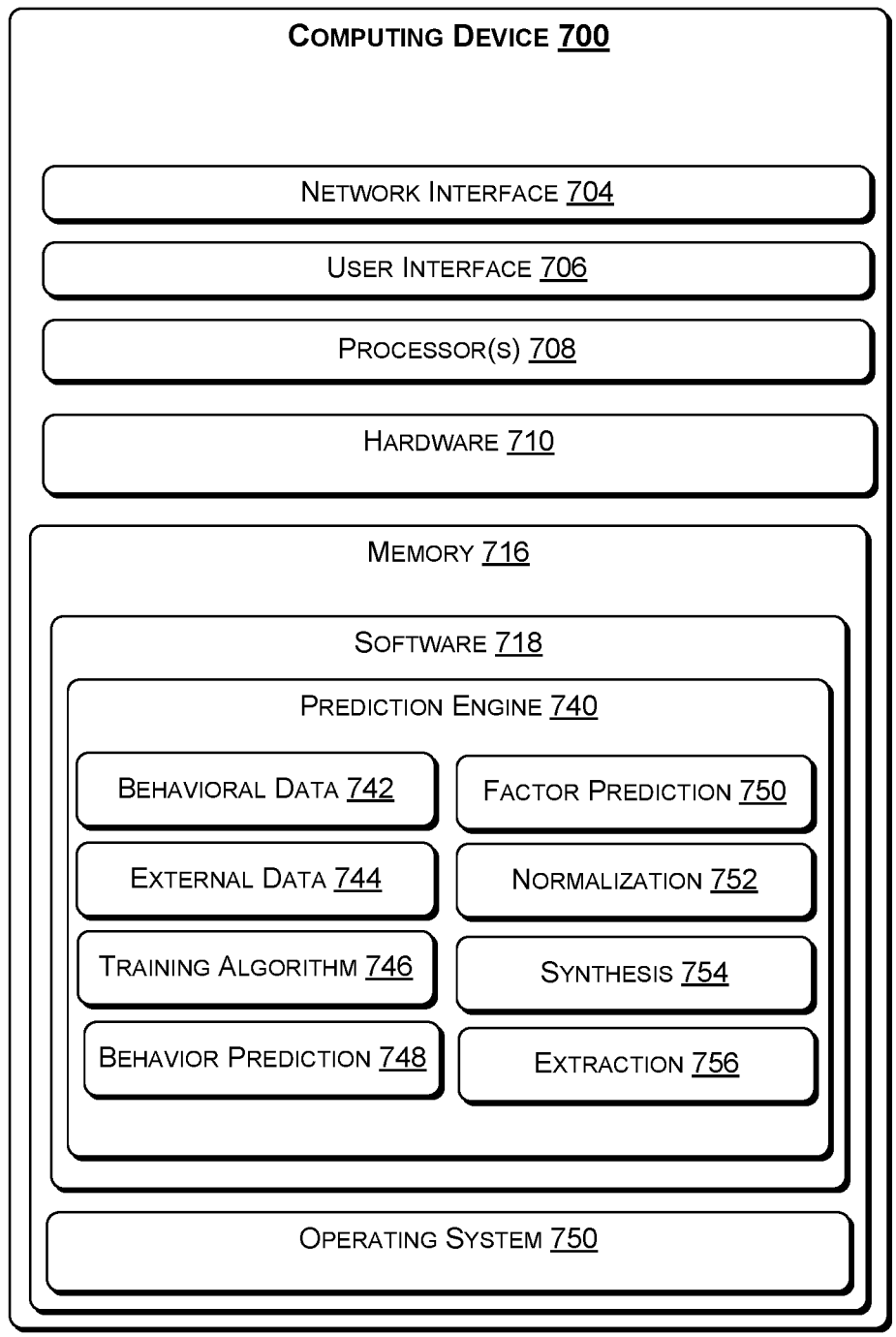
FIG. 7 provides a functional block diagram illustration of a computing device that is configured to provide a predictive analytic platform, consistent with an exemplary embodiment.

As discussed above, functions relating to predicting a time series value of behavioral data and identifying a causality between the predicted time series value and external factors can be performed with the use of one or more computing devices connected for data communication via wireless or wired communication, as shown in FIGS. 1 to 3 and in accordance with the processes of FIGS. 4 to 6. To that end, FIG. 7 provides a functional block diagram illustration of a computer hardware platform at a high level, which is configured to provide a predictive analytic platform.

The computing device 700 may include a network interface 704 for cellular, Wi-Fi communication, and/or wired communication; a user interface 706; one or more processors 708; hardware 710; and memory 716. In one embodiment, the computing device 700 includes a user interface 706 that enables a user to request and receive output from the computing device 700. For example, the user interface 706 may include a data output device (e.g., visual display, audio speakers, haptic device, etc.,). The user interface 706 may also include one or more data input devices. The data input devices may include, but are not limited to, combinations of one or more of keypads, keyboards, mouse devices, touch screens, microphones, speech recognition packages, and any other suitable devices or other electronic/software selection interfaces. For example, the data input devices may be used to receive a request for the computing device 700 to harvest behavioral data and external data to develop a first and second statistical prediction models to ultimately predict a time series value of the behavioral data and to identify a relative causal impact between the external data and the predicted time series value.

The computing device 700 may include one or more processors 708, which may be a single-core processor, a multi-core processor, a complex instruction set computing (CISC) processor, or another type of processor. The hardware 710 may include a power source and digital signal processors (DSPs), which may include single-core or multiple-core processors. The hardware 710 may also include network processors that manage high-speed communication interfaces, including communication interfaces that interact with peripheral components. The network processors and the peripheral components may be linked by switching fabric. The hardware 710 may further include hardware decoders and encoders, a network interface controller, and/or a universal serial bus (USB) controller.

The memory 716 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 716 may store various software components or modules that are executable or accessible by the processor(s) 708 and controller(s) of the computing device 700. The various components of the memory 716 may include software 718 and an operating system 720. The software 718 may also include a prediction engine 740 having several modules. Each module may include routines, program instructions, objects, and/or data structures that perform particular tasks or implement particular abstract data types.

For example, the prediction engine 740 of the computing device 700 may include a behavioral data module 742 configured to harvest behavioral data as one or more time series of a target data to be predicted. There may be an external data module 744 configured to harvest data of various factors that may affect the behavioral data time series.

There may be a training algorithm 746 configured to create a first statistical prediction model based on the behavioral data during a training phase. There may be one or more behavior prediction module(s) 748 configured to predict a value of the time series of one or more external factors, respectively. There may be a normalization module 752 configured to normalize the computed baseline of the harvested behavioral data and the various factors of the external data. The same module may be used to remove data points in the data series of the harvested behavioral data and/or the external data that are deemed to be outliers. There may be one or more extraction modules 756 configured identify indicia (e.g., Tweets) that mention terms related to the time series (e.g., products in the product category).

The operating system 750 may include components that enable the computing device 700 to receive and transmit data via various interfaces (e.g., user controls, communication interface, and/or memory input/output devices), as well as process data using the processors 708 to generate output. The operating system 750 may include a presentation component that presents the output (e.g., display the data on an electronic display of the computing device 700, store the data in memory 716, transmit the data to another electronic device, etc.). Additionally, the operating system 720 may include other components that perform various additional functions generally associated with an operating system 720.

An Example Multifactor Neural Network Attention Model

With the foregoing overview of the system 100 and the high-level discussion of example processes, it may be helpful to discuss the predictive modeling techniques used herein. One limitation of most traditional predictive modeling techniques, including Lasso Regression, Logistic Regression, Support Vector Machines, and MLP models is that they may require input features to be represented with a vector for each prediction step. Although it is possible in principle to turn a matrix or high order tensor into vectors through flattening, it is typically not possible without significant feature engineering on top of raw features to express, within the data, that there are realistic limitations in the search space of how input features could be combined.

In one embodiment, the neural network attention model discussed herein develops a model that is both sufficiently powerful to achieve superior empirical results, and offers causality information between the external factors involved and the predicted effect. Accordingly, users of the computing device using this model can understand the logic by which results are derived, enabling them to address circumstances when the model predicts various outcomes, including unusual outcomes. In one embodiment, it is assumed that the observation of each factor considered can ultimately be expressed as having an additive relationship with the expected forecast. This approach allows each external force to be hierarchically interpretable. For example, the model is interpretable both on the level of providing a prediction, such as the expected downturn in sales because of the predicted heat wave next week, and even further down to the specifics of the expectation based on the temperature that Wednesday.

Example Independent Observation Multifactor Model

Consider the broad class of models where a set of $N_f$ observations may be hierarchically attributed among a set of factors F in the previous period of relevant time $P_f$ that are assumed to account for the difference between a baseline forecast and the true signal. Each observation i for factor f at time instant $\tau$, $X_{if}(\tau)$ is assumed to have an independent effect $y_{if}(\tau)$ in modifying the baseline forecast $B(\tau)$ to produce prediction $p(\tau)$. The independent observation models are provided in equations 1 and 2 below.

$$y_{if}(\tau) = G(xif(\tau)) \qquad \text{[EQ. 1]}$$

$$p(\tau) = B(\tau) + \sum_f^F \sum_\tau^{P_f} \sum_i^{N_f} y_{if}(\tau) \qquad \text{[EQ. 2]}$$

The independent observation model of equations 1 and 2 provides that the additive effect of each observation of each factor can be treated as independent and therefore analyzed for all factors, at the granularity of a single observation of a behavior, and for any potentially interesting subset of observations and factors (e.g., simply by adding up the effects of the observations in the subset). Transaction data, referred to herein as behavioral data, has an additive relationship with the forecast represented as B(t) in equation 2. Observations in this context refer to external data sources, like weather, social media, etc. In one embodiment, although observations are treated as having an independent impact on the forecast, there is no restriction that the factors be processed by the computing device in isolation or without proper context, providing an algorithm with sufficient power through the function G( ) to express complex interactions and correlations.

Example Neural Network Independent Observation Model

In one embodiment, the above independent observation model uses neural networks trained end to end in a supervised fashion. In supervised learning, the prediction engine 104 of the computing device 104 may be presented with behavioral data as a time series for a training period, as discussed previously. It may be generally insufficient to analyze the raw signal $r_{if}$ of an observation in isolation. In this regard, the observation input also includes a concatenation with a vector that represents the context, as provided in equation 3 below.

$$x_{if}(\tau) = \text{concatenate}(r_{if}(\tau), \text{context}_{if}(\tau)) \qquad \text{[EQ. 3]}$$

For example, it may be difficult to determine if a 50° F. temperature in Ohio is relatively hot or cold without knowing both (i) the time of the year, and (ii) the recent weather trends in the region. In the experiments performed in connection with this application, a context vector is considered that includes a 107 dimensional one hot vector representing which store the prediction is for, a 4 dimensional vector representing the season and percent progress through that season, and computed differences between the observation in question and the average observation over both a one week and one month history.

In one embodiment, a neural network paradigm is applied to develop a formulation of G( ), which is explained in further detail below in equations 4 and 5 for a neural network with a single hidden layer of dimension D.

$$h_{if}(\tau) = \tan h(W_{hf} x_{if}(\tau) + b_{hf}) \qquad \text{[EQ. 4]}$$

$$y_{if}(\tau) = \tan h(W_{yf} h_{if}(\tau) + b_{yf}) \qquad \text{[EQ. 5]}$$

Where:
   W refers to learned matrices, and
   b refers to bias vectors.

Soft Attention Over Multifactor Models

As opposed to hard attention, in one embodiment, soft attention methods are used such that all input features are given consideration at a time of prediction. An example implementation of a soft attention approach for the independent observation model can be achieved with equations 6 to 9 below:

$$m_{if}(\tau) = \text{sigmoid}(W_{mf}h_{if}(\tau) + b_{mf}) \quad [\text{EQ. 6}]$$

$$d_{if}(\tau) = \tanh(W_{df}h_{if}(\tau) + b_{df}) \quad [\text{EQ. 7}]$$

$$a_{if}(\tau) = \frac{m_{if}(\tau)}{\sum_{f}^{F}\sum_{\tau}^{P_f}\sum_{i}^{N_f} m_{if}(\tau)} \quad [\text{EQ. 8}]$$

$$y_{if}(\tau) = a_{if}(\tau)d_{if}(\tau) \quad [\text{EQ. 9}]$$

In one embodiment, $d_{if}$ can be interpreted as determining the relative directional impact of the observation, and $a_{if}$ can be interpreted as modulating the amplitude of its impact in the context of the other observations and factors. First, each observation is considered in isolation and $m_{if}$ is determined as a measure of how interesting or unusual the observation is. Next, all of the observations are considered in context and a small subset is picked that is most likely to have influence on the forecast (i.e., predicted time series value). Consequently, the individual impact of each observation is assessed and added together to generate a prediction.

Example Sparse Attention

In one embodiment, only a relatively small subset of observations and factors should be considered to influence the prediction at a given time step. Therefore, in one embodiment, an L1 regularization over the over the importance for all observations is used in the loss function. L1 regularization is based on minimizing the L1 norm of the learned matrices of a model, which can promote sparsity. An example is provided of this loss function for the case of minimizing mean squared error, target t, and mif constrained to the positive range of 0 to 1 by the sigmoid function of equation 10 below.

$$\text{Loss}(\tau) = (t(\tau) - p(\tau))^2 + \beta \sum_{f}^{F}\sum_{\tau}^{P_f}\sum_{i}^{N_f} m_{if}(\tau) \quad [\text{EQ. 10}]$$

Where:
   B is a regularization parameter representing the coefficient of the attention regularization.

While a mean squared error loss function is used by way of example, it will be understood that other loss functions may be used instead. In one example, if the attention units are not constrained to be positive, the absolute value of $m_{if}(\tau)$ may instead be used in equation 10.

Addressing Unexplained Factors

In one scenario, an issue with the initial formulation of the independent observation model (discussed above in the context of the "Independent Observation Multifactor Model" section) is that it implicitly assumes that the differences between the baseline forecast B and the actual targets t can be accounted for entirely by the external factor observations. In one embodiment, there is an attention mechanism that balances the baseline forecast at the current time step $B(\tau)$ with the actual value at the last time step $L(\tau)$. The following equations illustrate the integration with the soft attention mechanism over observations and factors.

$$g(\tau) = \text{concatenate}(u(\tau), \text{context}(\tau)) \quad [\text{EQ. 11}]$$

$$m_B(\tau) = \text{sigmoid}(W_{mB}g(\tau) + b_{mB}) \quad [\text{EQ. 12}]$$

$$m_L(\tau) = \text{sigmoid}(W_{mL}g(\tau) + b_{mL}) \quad [\text{EQ. 13}]$$

$$m_{total}(\tau) = m_L(\tau) + m_B(\tau) + \sum_{f}^{F}\sum_{\tau}^{P_f}\sum_{i}^{N_f} m_{if}(\tau) \quad [\text{EQ. 14}]$$

$$a_L(\tau) = \frac{m_L(\tau)}{m_{total}(\tau)} \quad [\text{EQ. 15}]$$

$$a_B(\tau) = \frac{m_B(\tau)}{m_{total}(\tau)} \quad [\text{EQ. 16}]$$

$$a_{if}(\tau) = \frac{m_{if}(\tau)}{m_{total}(\tau)} \quad [\text{EQ. 17}]$$

$$p(\tau) = a_L(\tau)L(\tau) + a_B(\tau)B(\tau) + \sum_{f}^{F}\sum_{\tau}^{P_f}\sum_{i}^{N_f} y_{if}(\tau) \quad [\text{EQ. 18}]$$

$$\text{Loss}(\tau) = (t(\tau) - p(\tau))^2 + \beta m_{total}(\tau) \quad [\text{EQ. 19}]$$

The $m_{if}$ estimations for the observations are the same as before. For the case of the baseline $m_B$ and the last value $m_L$, a concatenation of a vector representing the local uncertainty u and a context vector may be used. In one embodiment, the uncertainty vector u is fixed to a vector represented by $[B(\tau), L(\tau), B(\tau)-L(\tau), B(\tau-1)-L(\tau)]$ at time instant $\tau$ and the context vector comprises the concatenation of a store vector and seasonal vector as discussed in the context of the "Simple Neural Network Independent Observation Model" section above. As provided in the equations above, in one embodiment, the consideration of the attention over the uncertainty is combined with the attention over the observations of external factors. Such approach allows the model to dampen focus on the last value when there is large uncertainty, and allows for attention on external factors to fall to zeros (as opposed to being fixed at a total of 1) when the modified baseline accurately models the target values.

Example Baseline Forecast

In one embodiment, the baseline model discussed herein decomposes the time series signal into multiple components that represent the internal factors towards the forecasts: level, trend, and the seasonal (periodic) components. The level component represents the constant demand value over the entire time period. The trend component represents the linearly increasing demand over time. The seasonal (periodic) components correspond to the periodic increase and decrease in the sales values due to seasonal demands. More precisely, if the true sales at time instant $\tau$ is $y(\tau)$, then the baseline model assumes that this signal value is generated as follows:

$$y(\tau) = l(\tau) + t(\tau) + \sum_{p=1}^{P} s_p(\tau) + e(\tau) \quad [\text{EQ. 20}]$$

Where:
l(τ)=L is the level component,
t(τ)=τT is the trend component,
$s_p(\tau)=s_p(\tau-\tau_p)$ is the seasonal,
e(τ) represents the anomalies attributed to the sparse unexplainable external factors,
L is the constant level value,
T is the linear trend value,
P is the number of periodic components, and
$\tau_p$ is the unknown period of the p-th periodic component.

The baseline forecasting process at time instant τ may use all the behavioral data without ex factors until time τ−1 to estimate the level, trend and seasonal components of the decomposition, with the resulting e(τ) capturing the residual anomalies. Once the parameters are estimated, the forecast prediction for the next time instant is given by the equation below.

$$b(\tau) = \hat{L}^{\tau-1} + \tau \hat{T}^{\tau-1} + \sum_{p=1}^{P} \hat{s}_p^{\tau-1}(\tau) \quad \text{[EQ. 21]}$$

Where:
$\hat{L}^{\tau-1}$, $\hat{T}^{\tau-1}$, and $\hat{s}_p^{\tau-1}$, are the estimates of L, T, and $s_p$, respectively, based on data observed until time τ−1.

Accordingly, in one embodiment, the prediction depends on the estimates of the unknown parameters. To estimate these values, a 2-step process that involves Fourier based synthesis and sparse regression may be used.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device comprising:
   a processor;
   a network interface coupled to the processor to enable communication over a network;
   a storage device for content and programming coupled to the processor;
   a prediction engine software stored in the storage device, wherein an execution of the software by the processor configures the computing device to perform acts comprising:
   harvesting a first set of time series data of a first continuous time period comprising behavioral data;
   harvesting a second set of time series data of the first continuous time period comprising data of one or more external factors acquired from a different source and based on a different type of data than the behavioral data;
   harvesting a continuation of the first set of time series data comprising new behavioral data, for a second time period;
   harvesting a continuation of the second set of time series data comprising new data of the one or more external factors, for the second time period;
   calculating, based on a forecast algorithm executable on the processor, a forecast time series value of a future behavioral data as a continuation of the first set of the time series data for a third time period that is after the second time period; and
   identifying, based on the forecast algorithm, a relative causal impact between each external factor and the predicted time series value of the behavioral data, for the third time period, wherein:
   harvesting the behavioral data comprises applying a first training algorithm executable on the processor to the first set of the time series data to create a first statistical prediction model that does not include the one or more external factors;
   harvesting the data of one or more external factors comprises applying an attention based deep learning algorithm executable on the processor to the second set of the time series data and the first statistical prediction model to create a second statistical prediction model; and
   both the first set and the second set of the time series data of the first and second statistical prediction models are of the same first continuous time period.

2. The computing device of claim 1, wherein harvesting the behavioral data comprises:
   receiving the first set of the time series data; and
   storing the first set of the time series data in the storage device.

3. The computing device of claim 2, wherein harvesting the data of one or more external factors comprises:
   receiving the second set of the time series data; and
   storing the second set of the time series data in the storage device.

4. The computing device of claim 3, wherein harvesting the behavioral data further comprises creating a learned model for an external factor for predicting a future value of the second time series of the same external factor.

5. The computing device of claim 3, wherein the forecast algorithm uses the second statistical prediction model, the new behavioral data, and the new data for the one or more external factors to calculate the forecast time series value of the future behavioral data for the third time period.

6. The computing device of claim 1, wherein the one or more external factors are selected from a group consisting of (i) a weather measurement, (ii) a price of gas, (iii) a social media, (iv) a national event, and (v) a regional event.

7. The computing device of claim 1, wherein the behavioral data is based on a category of target data to be predicted by the computing device.

8. The computing device of claim 1, wherein the calculation of the forecast time series value is based on an attention-based neural network.

9. The computing device of claim 8, wherein:
   the identification of the relative causal impact is via a score based on the relative causal impact between each external factor and the predicted time series value of the behavioral data, for the third time period; and
   an execution of the software by the processor further configures the computing device to perform an act comprising, assigning more emphasis to an external factor that has a higher relative causal impact score.

10. The computing device of claim 1, wherein execution of the software further configures the computing device to perform acts comprising:
    creating a learned model based on the second set of the time series data of the first continuous time period to predict a time series value of the second set of the time series data for a third time period.

11. A non-transitory computer readable storage medium tangibly embodying a computer readable program code having computer readable instructions that, when executed, causes a computer device to carry out a method of determining a forecast time series value, the method comprising:
harvesting a first set of time series data of a first continuous time period comprising behavioral data;
harvesting a second set of time series data of the first continuous time period comprising data of one or more external factors, acquired from a different source and based on a different type of data than the behavioral data;
harvesting a continuation of the first set of the time series data comprising new behavioral data, for a second time period;
harvesting a continuation of the second set of the time series data comprising new data of the one or more external factors for the second time period;
calculating, based on a forecast algorithm executable on the processor, a forecast time series value of a future behavioral data as a continuation of the first set of the time series data for a third time period that is after the second time period; and
identifying, based on the forecast algorithm, a relative causal impact between each external factor and the predicted time series value of the behavioral data, for the third time period, wherein:
harvesting the behavioral data comprises applying a first training algorithm executable on the processor to the first set of the time series data to create a first statistical prediction model that does not include the one or more external factors; and
harvesting the data of one or more external factors comprises applying an attention based deep learning algorithm executable on the processor to the second set of the time series data and the first statistical prediction model to create a second statistical prediction model; wherein both the first set and the second set of the time series data of the first and second statistical prediction models are of the same first continuous time period.

12. The non-transitory computer readable storage medium of claim 11, wherein harvesting the behavioral data comprises:
receiving the first set of the one or more time series data; and
storing the first set of the time series data in the storage device.

13. The non-transitory computer readable storage medium of claim 12, wherein harvesting the data of the one or more external factors comprises:
receiving the second set of the time series data; and
storing the second set of the time series data in the storage device.

14. The non-transitory computer readable storage medium of claim 13, wherein harvesting the behavioral data further comprises creating a learned model for an external factor for predicting a future value of the second time series of the same external factor.

15. The non-transitory computer readable storage medium of claim 13, wherein the forecast algorithm uses the second statistical prediction model, the new behavioral data, and the new data for the one or more external factors to calculate the forecast time series value of the future behavioral data for the third time period.

16. The non-transitory computer readable storage medium of claim 11, wherein the calculation of the forecast time series value is based on an attention-based neural network.

17. The non-transitory computer readable storage medium of claim 16, wherein:
the identification of the relative causal impact is via a score; and
an execution of the software by the processor further configures the computing device to perform an act comprising, assigning more emphasis to an external factor that has a higher relative causal impact score.

18. A method of determining a forecast time series value, the method comprising:
harvesting a first set of time series data of a first continuous time period comprising behavioral data;
harvesting a second set of time series data of the first continuous time period comprising data of one or more external factors acquired from a different source and based on a different type of data than the behavioral data;
harvesting a continuation of the first set of the time series data comprising new behavioral data, for a second time period;
harvesting a continuation of the second set of the time series data comprising new data of the one or more external factors, for the second time period;
calculating, based on a forecast algorithm executable on the processor, a forecast time series value of a future behavioral data as a continuation of the first set of the time series for a third time period that is after the second time period; and
identifying, based on the forecast algorithm, a relative causal impact between each external factor and the predicted time series value of the behavioral data, for the third time period, wherein:
harvesting the behavioral data comprises applying a first training algorithm executable on the processor to the first set of the time series data to create a first statistical prediction model that does not include the one or more external factors;
harvesting the data of one or more external factors comprises applying an attention based deep learning algorithm executable on the processor to the second set of the time series data and the first statistical prediction model to create a second statistical prediction model; and
both the first set and the second set of the one or more time series of the first and second statistical prediction models are of the same first continuous time period.

19. The method of claim 18, wherein harvesting the behavioral data comprises:
receiving, on a computing device, the first set of the of time series data; and
storing, on the computing device, the first set of the time series data.

20. The method of claim 19, wherein harvesting the one or more external factors comprises:
receiving, on the computing device, the second set of the time series data; and
storing, on the computing device, the second set of the time series data.

21. The method of claim 20, wherein harvesting the behavioral data further comprises creating a learned model for an external factor for predicting a future value of the second time series of the same external factor.

22. The method of claim 20, wherein the forecast algorithm uses the second statistical prediction model, the new behavioral data, and the new data for the one or more external factors to calculate the forecast time series value of the future behavioral data for the third time period.

23. The method of claim 18, wherein the calculation of the forecast time series value is based on an attention-based neural network.

24. The method of claim 23, further comprising assigning more emphasis to an external factor that has a higher relative causal impact score.

* * * * *